United States Patent [19]

Graves

[11] Patent Number: 4,570,690
[45] Date of Patent: Feb. 18, 1986

[54] MIXING PROCEDURE FOR OBTAINING FILLED RUBBER VULCANIZATES CONTAINING AROMATIC FURAZAN OXIDES

[75] Inventor: Daniel F. Graves, Clinton, Ohio

[73] Assignee: The Firestone Tire & Rubber Company, Akron, Ohio

[21] Appl. No.: 653,652

[22] Filed: Sep. 21, 1984

[51] Int. Cl.[4] .......................... C08C 4/00; C08K 5/35; C08K 3/04
[52] U.S. Cl. .................. 152/564; 152/374 R; 524/87; 524/89; 524/91; 524/92; 524/94; 524/496; 525/194; 525/233; 525/347; 525/375; 525/377; 525/381
[58] Field of Search ...................... 524/87, 89, 91, 92, 524/94, 496; 525/194, 233, 347, 375, 377, 381; 152/330 R, 374 R

[56] References Cited

U.S. PATENT DOCUMENTS 3,931,106  1/1976  Crosby ................................ 528/10

FOREIGN PATENT DOCUMENTS

WO83/04031  11/1983  PCT Int'l Appl. .
2010850  7/1979  United Kingdom .

*Primary Examiner*—Herbert J. Lilling
*Attorney, Agent, or Firm*—Daniel N. Hall

[57] ABSTRACT

Filled rubber vulcanizates containing aromatic furazan oxides exhibit many improved properties such as increased filler-rubber interaction and decreased hysteresis. Useful furazan oxides have both carbons of the furazan ring as part of a fused aromatic ring. Typical examples are benzofurazan oxide and its methyl and methoxy analogs. Tires made from the inventive vulcanizates show lower running temperatures and improved rolling resistance. The desirable effects of the aromatic furazan oxides may be improved by mixing the rubber, filler and furazan oxide in a conventional mechanical compounding device at specific temperatures and time periods such as about 200°–400° F. for 2–20 minutes.

17 Claims, No Drawings

MIXING PROCEDURE FOR OBTAINING FILLED RUBBER VULCANIZATES CONTAINING AROMATIC FURAZAN OXIDES

This invention relates to filler reinforced rubber vulcanizates. More particularly, it relates to improved procedures for mixing rubber with aromatic furazan oxides and reinforcing fillers to produce vulcanizates having improved properties such as reduced hysteresis. It also relates to articles and components made from such vulcanizates, such as tires and components thereof, and methods of improving the rolling resistance and running temperatures of such tires.

BACKGROUND OF THE INVENTION

It is well-known that, with very few exceptions, rubber compositions are compounded with various other materials before being vulcanized (that is, cured) and made into an end product. It is well-known that fillers, such as carbon black and silica are included in vulcanized rubber to reinforce and strengthen it. Some of the compounding materials improve the properties of the end product in service. In some instances, these beneficial effects can be achieved by promoting interactions between the various chemicals, fillers and other materials, both organic and inorganic, present in the vulcanizates. For further discussions of rubber compounding and vulcanization see, for example, *Encyclopedia of Polymer Science and Technology*, published by John Wiley and Sons, New York (1970), particularly volume 12, page 280 and *The Vanderbilt Rubber Handbook*, R. T. Vanderbilt Company, Norwalk, Conn., 06855 (1968), particularly Sections 7, 8 and 9, beginning at page 407 and Section 11 at page 644.

Benzofurazan oxides, and their analogs and isomers are known, and many descriptions of procedures for their preparation have appeared in the art. See, for example, Kaufman, et al., "Chemical Reviews," volume 9, pages 429 and following (1959), and the description in Mallory, et al., "Organic Synthesis" collective volume IV, pages 74 and 75, John Wiley and Sons, New York (1963). The following U.S. Patents also describe procedures for preparing furazan oxides of various types: U.S. Pat. No. 4,185,018 to Fah; U.S. Pat. No. 3,528,098 to Shaw; and U.S. Pat. No. 2,424,199 to Ter Horst.

In considering previous descriptions of furazan oxides and related compounds, it should be noted that nomenclature used has not been consistant, in part due to uncertainty as to the structure of these compounds. In some instances, they are described as furazan oxide isomers, such as ortho dinitroso benzenes. They have also been described as di(nitrile oxides) and at various points referred as isobenzofuroxans, benzofuroxans, benzofurazan-N-oxides and benzofurazan oxides. It is believed that the latter is the modern and preferred nomenclature, and it shall be used in this specification and the appended claims.

The effects of furazan oxides and related compounds in rubber compositions have been reported. For example, Rehner and Flory reported in *Industrial and Engineering Chemistry*, volume 38, page 500 et seq. that ortho dinitroso benzene was inactive as a vulcanizing agent in butyl rubber. In contrast, the para isomer was reported to be very active as a vulcanizing agent. U.S. Pat. No. 3,931,121 to Davis, et al., describes the curing of elastomeric polymers with poly (chloronitroso) compounds. U.S. Pat. No. 3,931,106 to Crosby, et al., describes the use of dinitrile oxides which can be generated in situ from furoxans in the cross-linking of rubbers. In this regard, it should be noted that the aromatic furoxans of the present invention cannot isomerize to di(nitrile oxides) because the bond between the adjacent carbon atoms is part of an aromatic ring. U.S. Pat. No. 2,974,120 to Miller describes the use of nonaromatic furazan oxides as antioxidants and antidegradants in rubber. U.S. Pat. No. 2,905,582 to Coleman, et al., describes the use of nitroso compounds, including dinitroso compounds wherein the nitroso groups are on nonadjacent carbons in a method for bonding polyurethane resin to rubber bodies. Morita has described the use of N, 4-dinitroso-N-methyl aniline as an active chemical promoter for carbon black reinforcement of IIR, NR and SBR. The *Rubber Chemistry and Technology*, volume 49, page 119 and following (1976). Tanaka, et al., have reported studies of nitroso benzene in rubber in Kogyo Kagaku Zasshi 74(8) pages 1701-6 (1971).

PCT application No. PCT/US 83/00697 (now EPO application No. 83902018.7) published Nov. 24, 1983, describes the use of aromatic benzofurazan oxides in both filled vulcanizates and uncured rubber compositions. This application is owned by the owner of the present application. U.S. patent application Ser. No. 621,656, filed June 18, 1984, describes modified carbon black products comprising carbon black and aromatic furazan oxides. These products can be used in the present invention.

SUMMARY OF THE INVENTION

A filled vulcanizate made by vulcanizing a composition comprising at least one rubber having an unsaturated carbon chain, filler and a minor, cured property-improving amount of at least one aromatic furazan oxide of the partial formula

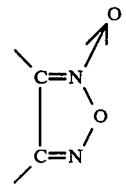

wherein the depicted carbon atoms are part of, a second, single aromatic ring, is improved in filler interaction, hysteresis, modulus, compression set and resiliency. Rubber articles and portions thereof made from such vulcanizates such as tires, hoses, belts, treads, sidewalls and the like are also within the scope of the invention as are methods for reducing the rolling resistance and running temperatures of such tires.

One aspect of the present invention is a method for preparing a filled rubber vulcanizate exhibiting improved properties, particularly reduced hysteresis, wherein a rubber having an unsaturated carbon chain, filler, and aromatic furazan oxide of the above formula are mechanically compounded at a temperature of about 200°-400° F. for a period of about 2-20 minutes. Another aspect of the present invention involves preparing tread stocks for use in pneumatic tires having improved rolling resistance and skid resistance. Said tread stocks are prepared by mechanically compounding filler with at least one rubber having an unsaturated carbon chain and the above described aromatic furazan oxide at a temperature of about 200°-400° F. for a period of about 2-20 minutes to form a rubber compound from which the tread stock and eventually the tire tread component are prepared. In order to insure complete reaction of the furazan oxide with the polymer rubber at lower temperatures, longer times are desirable, say 8 minutes at about 300° F., while at shorter times higher temperatures are desirable, say 2 minutes at about 400° F.; typically temperatures of 300°-375° F. and times of about 5-20 minutes are useful.

DETAILED DESCRIPTION OF THE INVENTION

The molecules in rubbers used in the vulcanizates of this invention have an unsaturated carbon chain, that is, the polymer backbones contain a significant amount of unsaturation, in contrast to the pendant or vinyl saturation as found in some other types of rubbers. Typically such rubbers have at least 5 percent, typically 20 percent, of their chain carbon-to-carbon bonds as unsaturated bonds. Characterization of rubber according to its unsaturated carbon chains it well-known as shown by the recommended practice for rubber and rubber latexes nomenclature in the ANSI/ASTM D 1418-79A specification. These rubbers are sometimes referred to as R rubbers and they include, for example, natural rubber and synthetic rubbers derived at least partly from diolefins. A non-exclusive list of R class rubbers which can be used in the vulcanizates of this invention follows:

ABR—Acrylate-butadiene
BIIR—Bromo-isobutene-isoprene
BR—Butadiene
CIIR—Chloro-isobutene-isoprene
CR—Chloroprene
IIR—Isobutene-isoprene
IR—Isoprene, synthetic
NBR—Nitrile-butadiene
NCR—Nitrile-chloroprene
NIR—Nitrile-isoprene
NR—Natural rubber
PBR—Pyridine-butadiene
PSBR—Pyridine-styrene-butadiene
SBR—Styrene-butadiene
SCR—Styrene-chloroprene
SIR—Styrene-isoprene rubbers.

Of these, vulcanizates based on NR, IR, BR, SBR, CR, CIIR, NIR or mixtures of two or more of these are typically used. Many vulcanizates are those wherein the rubber is NR, SBR or a mixture containing at least about 50 percent of one of these. Vulcanizates based solely on NR are often used. In the context of this invention, NR includes both heava and guayule rubber as well as mixtures thereof. EPDM type rubbers can also be used although they are not R-type.

The vulcanizates of the present invention also contain fillers of the conventional type such as carbon black in its many forms, clays, talc, pyrophyllite, silica and other inorganic, finely divided materials. In addition, they contain conventional curing systems and agents, such as sulfur, antioxidants, accelerators, retarders, coupling agents, promoters and the like. It should be noted, however, that it is sometimes desirable to take care in choosing such materials since they may interact with the furazan oxides.

The furazan oxides used in the vulcanized compositions of this invention are aromatic; that is, they contain an aromatic ring fused to the heterocyclic furazan ring. These furazan oxides are of the partial formula

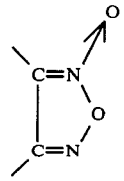

wherein the depicted carbon atoms are part of a single aromatic ring. The aromatic ring can be carbocyclic such as a benzene ring or it may be heterocyclic, such as a pyridine ring. It can be the only additional ring in the furazan compound, or it can be part of a linked or fused ring system. It is only necessary that both furazan carbon atoms also be part of the same aromatic ring. Exemplary of the furazan oxides useful in the vulcanizates of this invention are those that can be represented by the formulae:

wherein none, one or any two of the ring positions can be substituted with lower hydrocarbyl, halogen, lower hydrocarbyl oxy, lower hydrocarbyl thio, lower hydrocarbyl carbonyl, carbonyl lower hydrocarbyl oxy, nitro, amine or amino groups and Y is a linking atom or group. In this context, lower hydrocarbyl refers to groups of carbon and hydrogen having eight or less carbon atoms such as methyl, ethyl, butyl, pentyl, heptyl, and octyl (all isomers). Linking atoms or groups include ether, thio ether, sulfoxide, sulfone, amine, methylene and the like (including simple covalent bonds such as found in biphenyl) and the other linking groups shown in U.S. Pat. No. 3,528,098 (which is incorporated by reference herein for its disclosures in this regard).

Often the furazan oxide is a benzofurazan oxide of the formula

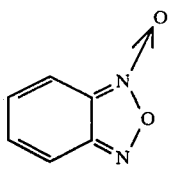

wherein none, one or any two of ring positions can be substituted with lower hydrocarbyl, halogen, low hydrocarbyl oxy, low hydrocarbyl thio, carbonyl low hydrocarbyl oxy, nitro, amine or amino groups. Typically, the furazan oxide is benzofurazan oxide or the methyl or methoxy analog thereof.

Methods for preparing, purifying and handling these compounds are known to the art as is shown by the references cited hereinabove. It should be noted that some furazan oxides, particularly those containing relatively large amounts of nitrogen and oxygen, can be prone to rapid decomposition to the point of explosions; all may be physiologically active to varying degrees. Therefore, care in their handling and use should be exercised.

The rubber formulations used to make the vulcanizates of the present invention through curing can be prepared by conventional technique using various types of mills, blenders and mixers known to the art. Usually the amount of furazan oxide used is such as to improve a vulcanizate (cured) property. As herein noted above, vulcanizate properties which can be improved include filler interaction, modulus, resiliency, hysteresis, rolling resistance, running temperature and the like. Typically, this amount ranges from about 0.1 to 10 parts per 100 parts (by weight) rubber (phr). Often the furazan oxide will be used in an amount ranging from 0.5–5 phr. The temperatures used in making the precured mixtures range from ambient, say 20°, to those conventially used in the art, such as 150° to 200°. As noted hereinabove fillers, promoters, curing agents and other conventional rubber additives are also often included in these precured mixtures in conventional amounts.

Specifically devices such as the well-known Brabender and Banbury mixers can be used to mechanically compound the rubber, filler and furazan oxide. To achieve improved hysteresis properties in the vulcanizate, the mixture is compounded at temperatures of about 200°–400° F., typically 325°–390° F., for about 2–20 minutes, say about 3–15 minutes. In the instance of a conventional size B Banbury mixer the apparatus is operated at a rotor speed at about 50 to about 150 rpm, while a laboratory 65 cc Brabender apparatus is operated at a mixing speed at about 60–100 rpm. Such devices can be equipped with thermocouples and water jackets to monitor and control mixing batch temperature. Finishing steps can be carried out on conventional equipment such as open mills using conditions and techniques known to the art. Similarly, tread components for pneumatic tires can be prepared by conventional procedures. It is found that the use of the hysteresis-reducing method of this invention provides tread stocks that, when fabricated in passenger tires, resulting in rolling resistance reductions of about 5 to 15% and more when compared with similar stocks lacking the aromatic furazan oxide additive.

In certain instances, it is convenient to combine the aromatic furazan oxide with an inert material which serves as a carrier and de-sensitizer. Organic materials such as methyl stearate, petroleum, wax, viscous mineral oils as well as inorganic and mixed materials such as clay, zinc stearate, diamataceous earth and the like can be used for this purpose. Such combinations usually contain about 25–95% active furazan oxide with balance being one or more inert material.

In certain instances the formation of an odoriferous by-product has been detected during practice of the method of this invention. It is believed this is a volatile reduction product of the furazan oxide (such as the analogous furazan) and precautions to avoid its inhalation may be desirable. For example, it is believed that at high temperatures (>250° F.) detectable amounts of benzofurazan (BFZ) may be formed from the analogous oxide (BFO).

The vulcanizates of this invention are prepared by curing the furazan oxide containing compositions under conditions of temperature and time customarily used in the art, and the invention is not significantly dependent on such curing variables. Typically the rubber and filler (or pigment) are first mixed and then the mixture treated with furazan oxide before curing. Other sequences can also be used but it is essential to have the rubber, filler (pigment) and furazan oxide intimately combined before vulcanization.

EXAMPLES AND DESCRIPTION OF BEST MODE

The following nonlimiting examples illustrate and exemplify the practice of the invention and include the best mode presently known. In them, all parts and percentages are by weight (pbw) unless specifically noted otherwise, and temperatures are in degrees centigrade unless indicated as being in degrees Fahrenheit (°F.). Conventional rubber compounding and curing materials, conditions, techniques, temperatures and evaluation procedures are used unless noted to the contrary.

Unless otherwise indicated, in the following examples, an internal mixer, such as a Brabender or small size Banbury mixer, was used to prepare mixtures for curing. The usual technique was to add various parts of the composition to the mixer and continue mixing for the indicated time period and then make further additions. The standard technique was according to the following procedure:

| TIME | ADD TO MIXER |
|------|--------------|
| 0    | Polymer, 100 parts |
| .5   | Half charge filler plus furazan oxide |
| 1.5  | Balance filler, zinc oxide, stearic acid |
| 3.0  | Processing oil |
| 6.0  | Drop mixed composition at 320–340° F. |

Masterbatches prepared according to the above procedure were immediately banded and sheeted on a small twin roll mill for two minutes set at 60 gauge. Mooney viscosities were measured using the large rotor, and a four minute cycle at 212° F. Master batches prepared essentially according to this schedule were combined with conventional elastomer curing systems in typical amounts and cured for 15, 23 and 30 minutes at 300° F. to provide test specimens. Typical conventional curing systems include sulfur-, peroxide-, urethane-, and benzoquinone dioxime systems.

EXAMPLE ONE

A series of vulcanizates was prepared using a conventional carbon black containing formulation and sulfur based curing system. The vulcanizates also contained about 20 parts Hi—Sil silica and conventional amounts of zinc oxide, antioxidants, softener, resin, sulfenamide accelerator, sulfur and retarder. The first (the control) contained no promoter, the second 0.6 phr Nitrol (Monsanto Chem. Co.) and the third 1.0 phr benzofurazan oxide (BFO). Nitrol is a known promoter and was used at its recommended level. Evaluation data for each vulcanizate are shown in Table I. Clearly the BFO-oxide-containing vulcanizate is superior in most properties and exhibits no significant deficiencies in any property.

EXAMPLE TWO

Typical truck tire tread vulcanizates were prepared from grade B natural rubber filled with silica (about 80 parts phr Hi—Sil) and containing conventional amounts of silane coupling agent, plasticizer, antioxidants, processing oil, sulfur, accelerator retarder, resin and activator. It was noted that the conventional composition was hard to mix in a 1.3 Kg Banbury and when dropped was very dry and stiff with the appearance of sawdust. The same mixture containing, in addition, 1 phr BFO was ready to drop after only six minutes but was given the same 12 minute mix as the control. It dropped smoothly from the Banbury and did not exhibit the stiffness and appearance of the control. The two compounds were cured in the same manner and evaluated in a number of standard tests. The results of these evaluations are shown in Table II. Clearly the vulcanizate containing 1 phr benzofurazan showed improved (that is, lower) running temperature and increased rebound. Other properties are not significantly diminished by the presence of the furazan oxide.

EXAMPLE THREE

A series of typical tread stocks was prepared from synthetic rubber according to a typical tread stock recipe calling for about 60 parts carbon black (N-351). The control contained no additive and Examples 3A and 3B contained one phr of methoxy benzofurazan oxide and benzofurazan oxide, respectively. Each stock was cured in the usual manner and the vulcanizate specimens evaluated in a number of standard tests. As can be seen from the data in Table III, the stocks containing the benzofurazan oxides showed superior properties.

TABLE I

| Promoter/Feature | None (Control) | Nitrol | Benzofurazan Oxide |
|---|---|---|---|
| Monsanto Rheometer 300° F. | | | |
| TS(2) | 7.4 | 7.7 | 8.7 |
| TC(90) | 21.3 | 21.3 | 19.8 |
| Min. Torque | 9.8 | 10.8 | 7.4 |
| Torque at 90% Cure | 38.0 | 38.1 | 37.1 |
| Max. Torque | 41.1 | 41.1 | 40.4 |
| CRI | 7.2 | 7.4 | 9.0 |
| Shore "A" Hardness | | | |
| 73° F. | 72 | 71 | 71 |
| 212° F. | 66 | 65 | 63 |
| Ring Tear at 212° F. | 558 | 552 | 433 |
| Ring Tensile at ambient temp. | | | |
| 300% Modulus | 1914 | 1947 | 2410 |
| Tensile | 2573 | 2479 | 2868 |
| Elongation | 391 | 368 | 352 |
| Aged Ring Tensile 2 days at 212° F. | | | |
| 200% Modulus | 1614 | 1628 | 1848 |
| Tensile | 2211 | 2307 | 2542 |
| Elongation | 275 | 280 | 270 |

TABLE I-continued

| Promoter/Feature | None (Control) | Nitrol | Benzofurazan Oxide |
|---|---|---|---|
| Rebound 73° F. | 39.5 | 42.0 | 51.0 |
| Firestone Flexometer 550 lbs, .4" throw | | | |
| % Deflection | 26 | 22.7 | 22.7 |
| Blow-out, min. | 9 | 9 | 13 |
| Firestone Flexometer 250 lbs, .3" throw | | | |
| % Deflection | 8 | 8 | 10.7 |
| Running Temp., °F. | 340 | 317 | 268 |

TABLE II

| | Control | 1 Phr, Benzo-Furazan Oxide |
|---|---|---|
| Shore "A" Hardness | | |
| 73° F. | 68 | 69 |
| 212° F. | 67 | 63 |
| Ring Stress-Strain | | |
| 23' cure - 300% Mod. | 1619 | 1178 |
| Tensile | 2546 | 2072 |
| Elongation | 449 | 463 |
| MTS 7% Deflection, 10 lbs, 10 HZ | | |
| K' | 1400 | 1130 |
| K" | 302.8 | 247.5 |
| Tan delta | .216 | .219 |
| Monsanto Rheometer at 300° F. | | |
| TS(2) | 10.3 | 8.7 |
| TC(90) | 15.3 | 16.1 |
| Min. Torque | 15.5 | 12.8 |
| Torque at 90% Cure | 51.1 | 40.8 |
| Max. Torque | 55.0 | 43.9 |
| CRI | 20.0 | 13.5 |
| % Rebound | | |
| 73° F. | 36 | 41 |
| 212° F. | 53 | 55 |
| Ring Tear at 212° F. | 490 | 344 |
| Firestone Flex-250 lbs, .3" throw | | |
| % Deflection | 7.3 | 14.0 |
| Running Temp., °F. | 385 | 295 |

TABLE III

| Promoter/Feature | None (Control) | Benzofurazan Oxide | Methoxy Benzofuran Oxide |
|---|---|---|---|
| Monsanto Rheometer 300° F. | | | |
| TS(2) | 14.3 | 16.3 | 16.4 |
| TC(90) | 23.3 | 22.3 | 23.2 |
| Min. Torque | 11.3 | 12.0 | 9.6 |
| Torque at 90% Cure | 39.5 | 39.3 | 38.4 |
| Max. Torque | 42.6 | 42.3 | 41.6 |
| CRI | 11.1 | 16.7 | 14.7 |
| Shore "A" Hardness | | | |
| 73° F. | 60 | 57 | 58 |
| 212° F. | 58 | 56 | 56 |
| Ring Tear at 212° F. | 147 | 137 | 147 |
| Ring Tensile at ambient temp (cured 30' at 300° F.) | | | |
| 300% Modulus | 1594 | 2065 | 1806 |
| Tensile | 2375 | 2154 | 2172 |
| Elongation | 399 | 311 | 345 |
| Rebound: 73° F. | 43 | 51.0 | 49.0 |
| Rebound: 212° F. | 63 | 69 | 68 |
| Firestone Flexometer 250 lbs, .3" throw | | | |
| % Deflection | 15.3 | 16 | 15.3 |
| Running Temp., °F. | 254 | 235 | 245 |
| Resistivity, 30' 300° F. | −11 | −0.4 | −1.2 |
| C.B. Dispersion, % | 93 | 91 | 95 |
| Carbon Bound Rubber, % | 19.6 | 36.0 | 28.2 |

TABLE III-continued

| Promoter/Feature | None (Control) | Benzofurazan Oxide | Methoxy Benzofuran Oxide |
|---|---|---|---|
| Rolling Resistance, % MTS 7% Deflection, 10 lbs, 10 FlZ | par | −5 | — |
| K' (Ambient Temp.) | 95.0 | 900 | 930 |
| K" (Ambient Temp.) | 197 | 144 | 156 |
| Tan delta (Ambient Temp.) | .207 | .160 | .168 |
| K' delta (212° F.) | 800 | 750 | 770 |
| K" delta (212° F.) | 137 | 99 | 112 |
| Tan delta (212° F.) | .171 | .131 | .146 |

EXAMPLES FOUR-SIX

BFO (100% pure) is added to the oil-extended solution SBR, (tradename, Duradene from The Firestone Tire & Rubber Company, Akron, Ohio) test formulation shown in Table IV, Example 5 at a level of 1.25 phr. A control stock containing no BFO (Example 4) and a second inventive stock containing 2.0 phr of a mixture of 70 BFO/30 methyl stearate (Example 6) are also prepared in the same manner.

The oil-extended SBR elastomer used is a solution, stereo-regular copolymer of styrene and butadiene with 37.5 phr oil and 25% bound styrene. The masterbatches are mixed in a 1300 cc size B Banbury mixer using no cooling water and the temperature is allowed to reach 193° C. (380° F.) before dropping the batch. All batches are mixed according to the Schedule set forth in Table V using identical conditions. The sulfenamide accelerator and the sulfur are added on an open mill keeping the temperature of the banded stock at 220° F. Test samples are then sheeted and cured 35 min. at 300° F.

Hysteresis is measured using two methods. An MTS 830 Elastomer Test System is used in compression on a cylindrical test specimen measuring 22 mm in diameter by 18 mm in height. Test conditions are as follows: 4.54 Kg preload, 7% strain, 10 HZ at room temperature and 100° C. A standard impact resilience or rebound test is also used as a measure of relative hysteresis. This test is also run at room temperature and 100° C.

TABLE IV

| Example | 4* | 5 | 6 |
|---|---|---|---|
| Oil Extended SBR | 137.5 | 137.5 | 137.5 |
| N339 (HAF) Carbon Black | 63 | 63 | 63 |
| Zinc Oxide | 1.6 | 1.6 | 1.6 |
| Stearic Acid | 4.0 | 4.0 | 4.0 |
| BFO (100%) | — | 1.25 | — |
| 70 BFO/30 Methyl stearate | — | — | 2.0 |
| N—t-butyl-2-benzothiazyl-sulfenamide | 1.0 | 1.0 | 1.0 |
| Sulfur | 3.83 | 3.83 | 3.83 |
| Total, pbw | 210.93 | 212.18 | 212.93 |

*Comparative Example, not of the invention

TABLE V

MIXING SCHEDULE

| Ingredient | Time (min.) |
|---|---|
| Elastomer | 0 |
| ½ Black + BFO + Stearic Acid | 1 |
| ½ Black + ZnO | 2 |
| Sweep down | 3 |
| Drop | 6.5–7.0 |
| Temp. | 193° C. |
| Banbury rotor speed = 80 R.P.M. | |

EXAMPLES SEVEN AND EIGHT

A study is conducted to define the optimum mix conditions for tire tread stocks containing BFO. A 65 cc Brabender mixer is used at a mixing speed of 80 RPM. Control stocks (SEVEN) and stocks containing 1 phr BFO (EIGHT) are mixed using jacket temperatures of 212°, 300° and 380° F. for periods of 2.5, 6.0 and 10 minutes. At 212° F. mixing times of 2.5 and 15 minutes were used. The temperature of each batch is taken at the end of the mix cycle using a needle thermocouple. The batches are all finalled on an open mill using identical mixing procedures.

Table VI shows the basic formulations used in this experiment. The rheometer, rebound and MTS data from the various mixes are determined as are the % BFO and % Benzofurazan (BFZ) in the BFO reduction product found in the masterbatches from HPLC analysis.

After a 2.5 minute mix at 260° F. almost all of the original BFO is present in the masterbatch and very little smell was detected. This stock also shows no reduction in hysteresis. The BFO level drops significantly after 15 minute at 280° F. and hysteresis is reduced by 20%. The 6 and 10 minute mixes at 320 and also the 2.5, 6 and 10 minute mixes at 350 to 370° F. all show negligible levels of BFO, however, the BFZ levels are significant (0.07 to 0.099%).

It is found that a 6 minute mix at a jacket temperature of 380° F. (drop temperature of 371° F.) is about optimum to produce the desired promoter effect with this rubber and filler and can reduce hysteresis by as much as 35%. It is also observed that longer mix times have more of an effect on the hysteresis of the control stock than increasing mix temperature. A 2.5 minute mix at 355° F. only reduces hysteresis by 5% over a 2.5 minute mix at 253° F., however, a 10 minute mix at 373° F. reduces hysteresis by 13% and a 15 minute mix at 279° F. reduces tan delta by 6%.

On the other hand, with the BFO promoted stocks both long mixes at lower temperatures and short mixes at higher temperatures produce significant reductions in hysteresis. It is found that a 15 minute mix at 280° F. produces a 21% reduction in hysteresis over a 2.5 minute mix at 260° F. and a 2.5 minute mix at 355° F. shows a 27% reduction in tan delta over the 2.5 minute mix at 260° F. There doesn't seem to be an advantage in mixing 10 minutes vs. 6 minutes at the higher temperatures. However, the data indicate that shorter mix times at higher temperatures are preferred.

From the aforedescribed series and experiments, it can be concluded that, in this formation virtually all of the BFO can be reacted with the polymer, or converted to BFZ after about a 6 minute mix in a preheated cavity dropped at 350° to 370° F.

While the invention has been described and exemplified herein by reference to specific materials, machinery, techniques, procedures and examples, it is understood that it is not restricted to these; numerous variations, combinations and permutations can be made within the scope of the invention as is clear to those of skill in the art.

TABLE VI

| Component Example | 7* | 8 |
|---|---|---|
| SBR Rubber | 137.5 | 137.5 |
| N339 Black | 63 | 63 |
| ZnO | 1.6 | 1.6 |

TABLE VI-continued

| Component Example | 7* | 8 |
| --- | --- | --- |
| Stearic Acid | 4.0 | 4.0 |
| BFO/Methyl stearate | — | 2.0 |
| Santocure NS (AO) | 1.0 | 1.0 |
| Sulfur | 3.83 | 3.83 |
| Total | 210.93 | 212.93 |

*Comparative Example, not of the invention

What is claimed is:

1. A filler reinforced vulcanizate made by vulcanizing a composition comprising at least one rubber having an unsaturated carbon chain, reinforcing filler and a minor, cured property-improving amount of at least one aromatic furazan oxide of the partial formula:

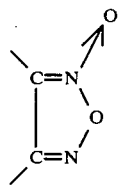

wherein the depicted carbon atoms are part of a single aromatic ring, said composition prepared by mechanically compounding the rubber, filler and furazan at a temperature of at least about 280°-400° F. for at least about 2 minutes.

2. The vulcanizate of claim 1 wherein the rubber is NR, IR, BR, SBR, CR, CIIR, NIR or a mixture of two or more of these.

3. The vulcanizate of claim 1 wherein the rubber is NR, SBR or a mixture containing at least about 50 percent NR, and the filler is carbon black, silica or a mixture of these.

4. The vulcanizate of claims 1, 2 or 3 wherein the furazan oxide is benzofurazan oxide or a methyl or methoxy analog thereof.

5. A tire having at least a portion thereof made of the vulcanizate of claims 1 or 2.

6. A tire having at least a portion of the tread thereof made of the vulcanizate of claims 1 or 2, said vulcanizate comprising NR or a mixture containing at least 50 percent NR.

7. A method of reducing the rolling resistance of a tire which comprises hysteresis of a vulcanizate comprising an R rubber, reinforcing filler and the furazan oxide of claim 1 which comprises mechanically compounding the rubber, filler and furazan for at least 2 minutes at about 280°-400° F.

8. A method of reducing the running temperature of a tire which comprises making at least a portion of the tire from a filled vulcanizate made by the method of claim 7.

9. A method of promoting rubber-filler interaction in a filled vulcanizate containing at least one rubber having an unsaturated carbon chain and reinforcing carbon black and/or silica filler which comprises including in the vulcanizate a minor, filler-interaction-promoting amount of aromatic furazan oxide of the partial formula:

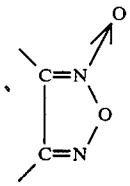

wherein the depicted carbon atoms are part of a single aromatic ring and mechanically compounding the rubber, filler and furazan oxide and about 280°-400° F. for a period of about 2-20 minutes.

10. A filler reinforced vulcanizate made by vulcanizing a composition comprising at least one rubber having an unsaturated carbon chain, reinforcing filler and a minor, cured property improving amount of at least one aromatic furazan oxide of the partial formula:

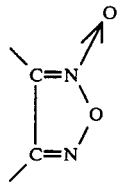

wherein the depicted carbon atoms are part of a single aromatic ring, said composition prepared by mechanically compounding the rubber, filler, and furazan at a temperature of at least about 300°-375° F. for at least 5-20 minutes.

11. The vulcanizate of claim 10 wherein the rubber is NR, IR, BR, SBR, CR, CIIR, NIR or a mixture of two or more of these, and the filler is carbon black, silica or a mixture of these.

12. The vulcanizate of claim 11 wherein the furazan oxide is benzofurazan oxide or a methyl or methoxy analog thereof.

13. A tire having at least a portion thereof made of the vulcanizate of claim 10.

14. A tire having at least a portion of the tread thereof made of the vulcanizate of claim 10, said vulcanizate comprising NR or a mixture containing at least 50 percent NR.

15. A method of reducing the rolling resistance of a tire which comprises hysteresis of a vulcanizate comprising an R rubber, reinforcing filler and the furazan oxide of claim 1 which comprises mechanically compounding the rubber, filler and furazan for at least 5-20 minutes at about 300°-370° F.

16. A method of reducing the running temperature of a tire which comprises making at least a portion of the tire from a filled vulcanizate made by the method of claim 15.

17. A method of promoting rubber-filled interaction in a filled vulcanizate containing at least one rubber having an unsaturated carbon chain and reinforcing carbon black and/or silica filler which comprises including in the vulcanizate a minor, filler-interaction-promoting amount of aromatic furazan oxide of the partial formula:

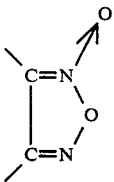

wherein the depicted carbon atoms are part of a single aromatic ring and mechanically compounding the rubber, filler and furazan oxide at about 300°-375° F. for a period of about 5-20 minutes.

* * * * *